United States Patent [19]
Marcy et al.

[11] 3,738,754
[45] June 12, 1973

[54] OPTICAL CONTACTING SYSTEMS FOR POSITIONING AND METROLOGY SYSTEMS

[75] Inventors: Raymond Marcy; Michel Lacombat, both of Paris, France

[73] Assignee: Thomson-CSF, Paris, France

[22] Filed: Mar. 18, 1971

[21] Appl. No.: 125,640

[30] Foreign Application Priority Data
Mar. 20, 1970 France .............................. 701063

[52] U.S. Cl. ............................................. 356/106
[51] Int. Cl. ............................................. G01b 9/02
[58] Field of Search ........................... 356/106–113

[56] References Cited
UNITED STATES PATENTS
3,436,153  4/1969  Baldwin ............................ 356/106
3,572,935  3/1971  Howell .............................. 356/106

*Primary Examiner*—Ronald L. Wibert
*Assistant Examiner*—Conrad Clark
*Attorney*—Cushman, Darby & Cushman

[57] ABSTRACT

The invention relates to optical connecting systems for accurately positioning a surface with respect to another surface.

The contacting system according to the invention comprises a Michelson interferometer in one arm of which an optical length modulating device is introduced. The source of radiant energy has an emission spectrum including two distinct spectral portions which are seperately sensed in the detection arm of the interferometer. The detected signals are superimposed at the input of a synchronous detector, the output of which is coupled to a zero indicator.

The contacting devices in accordance with the invention are used in laser metrology systems.

12 Claims, 10 Drawing Figures

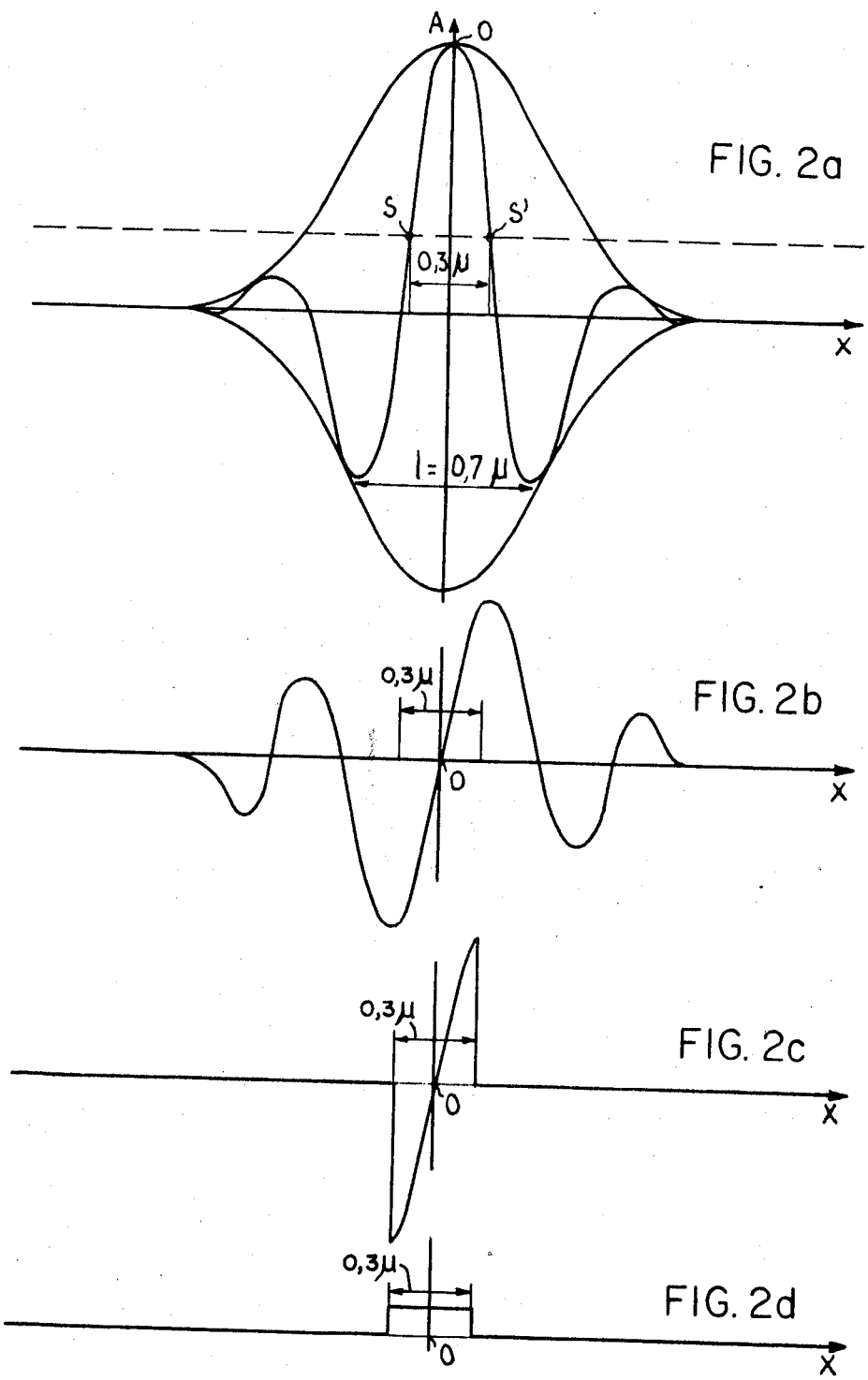

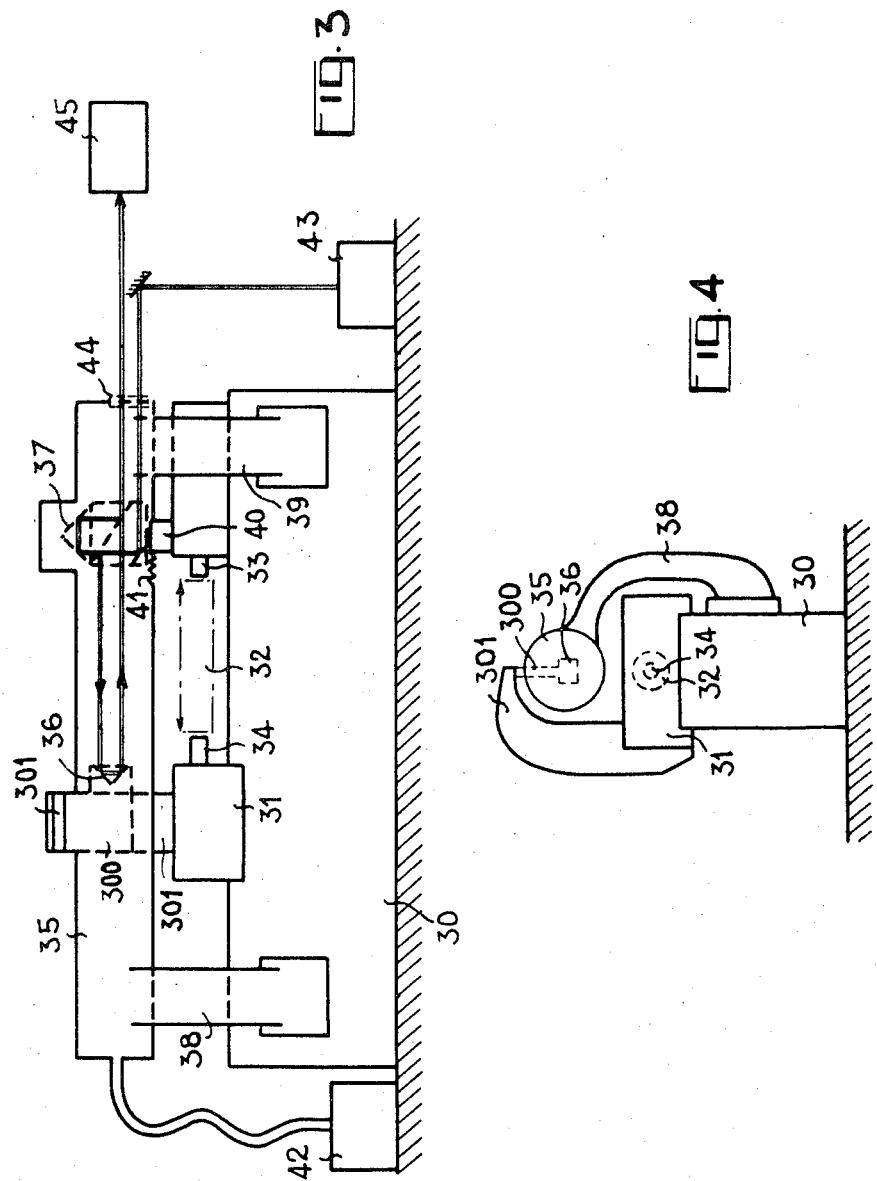

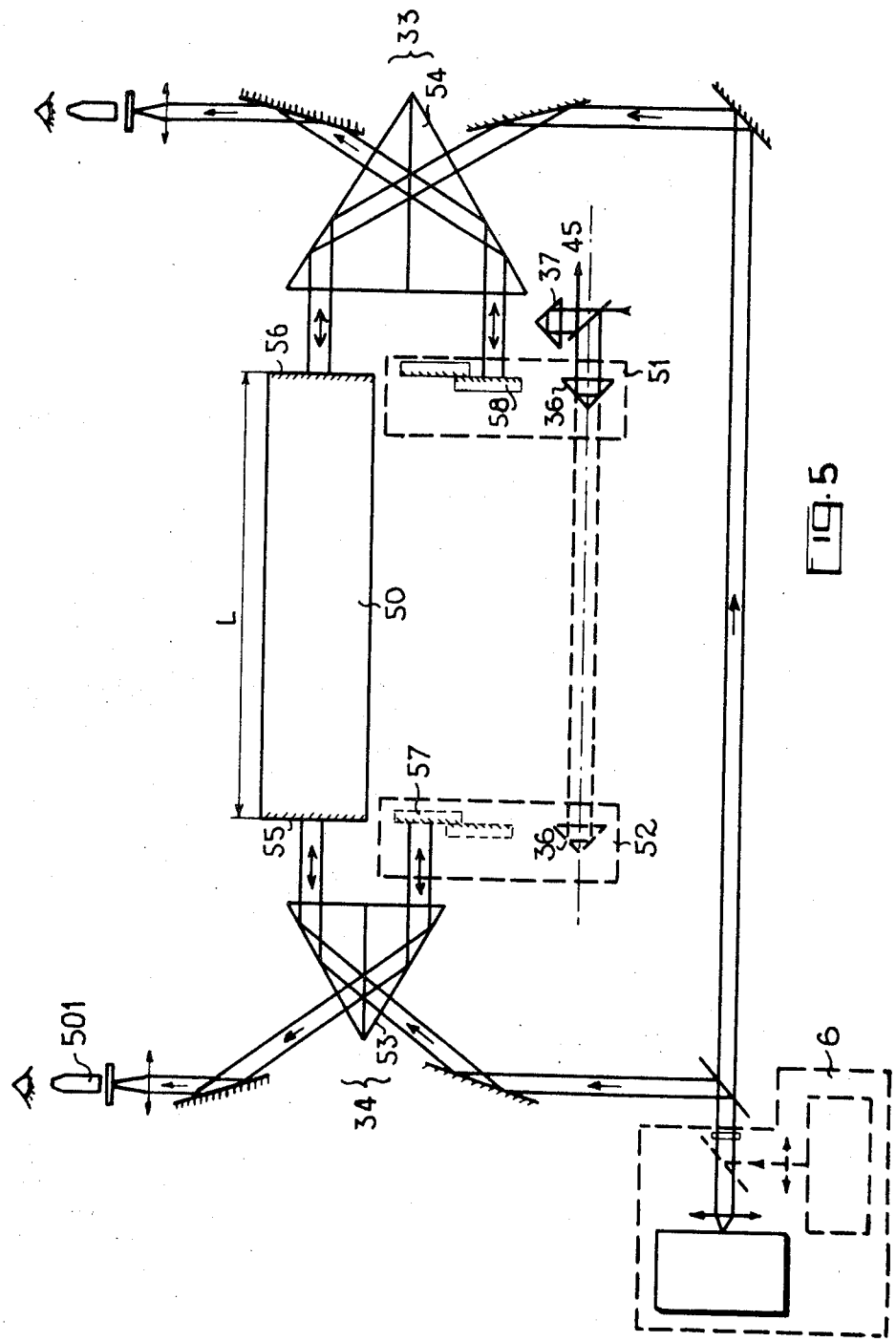

OPTICAL CONTACTING SYSTEMS FOR POSITIONING AND METROLOGY SYSTEMS

The present invention relates to improved optical contacting devices enabling the position of a component to be marked with a high degree of accuracy. Compared with conventional mechanical sensing devices optical contacting devices have the substantial advantage that they eliminate the uncertainties associated with the quality of material contacts, a quality which is far from adequate in very high-precision metrology systems.

Optical contacting devices employing interferometry techniques have already been produced. They are generally delicate items to use, and the interpretation of the results which they give is far from easy, since it consists essentially in an optical observation of interference fringes.

The object of the present invention is to create improved optical contacting devices based upon interferometric techniques, the improvement being on the one hand in the optical section proper, of said contacting devive, and on the other hand in the "result-processing" section, in order that data concerning the position of the component being marked is obtained virtually without ambiguity and with a very high degree of accuracy. Contacting devices of this kind are particularly significant either in the context of simple positional marking operations designed to achieve accurate positioning of components in the manner required for example in the production of sub-miniature circuits, or in metrology operations.

According to the present invention there is provided an optical contacting system for supplying an indication of the length difference between a first and a second optical path respectively ending on first and second reflecting faces, said contacting system comprising: a source of radiant energy supplying a beam having an emission spectrum including two distinct spectral portions, beam splitting means having an input for receiving said beam, first and second outputs for supplying split beams respectively illuminating said faces, and a further output; first and second photoelectric means positioned for receiving from said further output radiant energies respectively reflected from said faces, said photoelectric means having respective outputs; means for periodically modulating the length of one of said optical paths at a predetermined frequency; synchronous demodulator means operated of said frequency, and having an input connected to said outputs, and an output; threshold means having an input coupled to said demodulator means input and an output; gating means having an input coupled to the output of said threshold means, a further input coupled to the output of said demodulator means and an output, and indicator means coupled to said last mentioned output; said photoelectric means being respectively responsive to said spectral portions.

There is also provided: a metrology bench incorporating optical contacting systems for measuring the distance separating two reflecting end faces of an object, said metrology bench comprising: an optical contacting system positioned at each end of said bench and a carriage sliding on said bench and interferometric displacement sensing means for accurately measuring the displacement of said carriage along said bench; one of the reflecting faces of said optical contacting systems being one of the reflecting faces of said object; said other reflecting face of said optical contacting systems being integral with said carriage; the reflecting faces of said object being perpendicular to the direction of translation of said carriage.

Optical contacting devices of this kind are utilizable in particular in special embodiments which are described hereinafter and which form the subject of the present invention, either for the highly accurate measurement of the lengths of components (in this case, two such contacting devices are employed in a laser metrology system for example), or for high-precision positioning of components, something which is extremely useful in the context of the manufacture of sub-miniature circuits (in this case a contacting device is prepositioned upon the production machine and the component is positioned in relation to the contacting device, at the same location each time).

Other objects and features of the invention will be apparent from the following description given here by way of a non-limitative example and illustrated by the attached figures in which:

FIG. 2 illustrates graphs $a$, $b$, $c$ and $d$ representing the form of the signal obtained at various points in the electronic circuits associated with the optical contacting device of FIG. 1;

FIG. 3 is a schematic elevational view of an interferometer measuring bench comprising optical contacting devices in accordance with the invention;

FIG. 4 is an end view of the assembly of FIG. 3;

FIG. 5 illustrates the optical arrangement of the measuring bench of FIG. 3.

Figure 1:
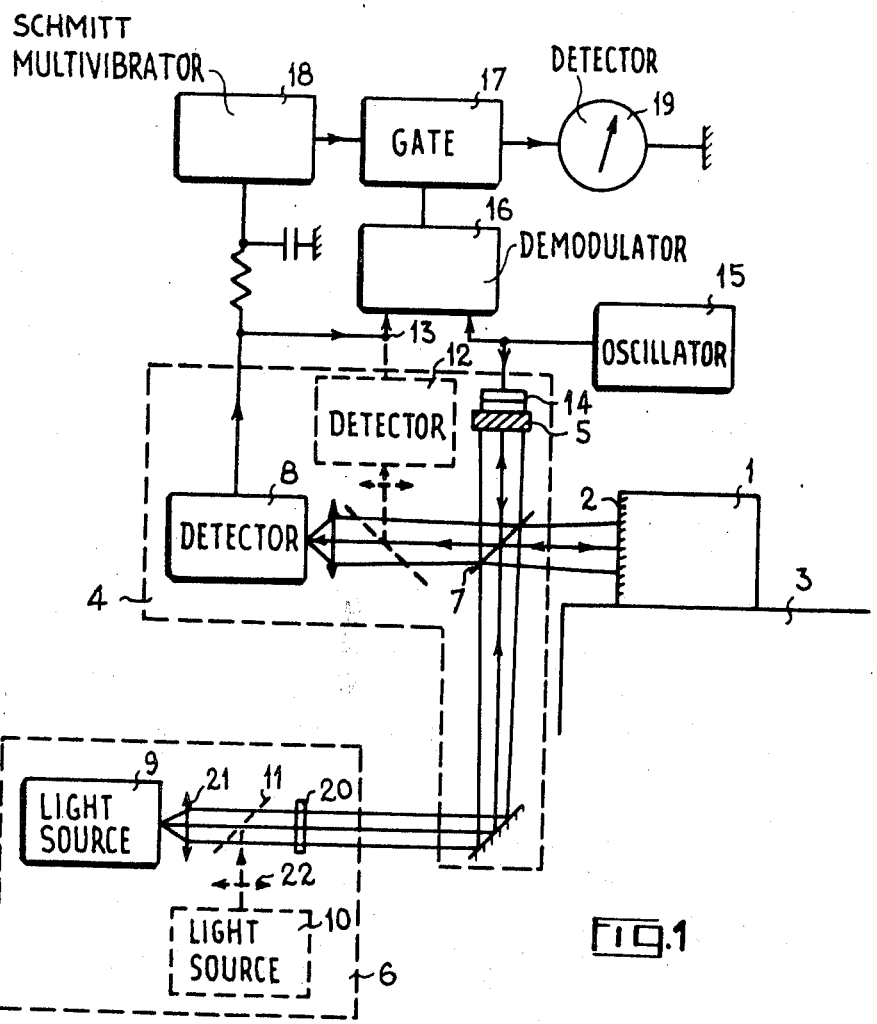
FIG. 1 is a diagram showing the principle of a first variant of realization of an optical contacting device in accordance with the invention and its associated circuits.

FIG. 1 schematically illustrates a first variant of an optical contacting device in accordance with the invention and its associated circuits.

A component 1 having a reflective face 2 is placed for example upon a frame 3. The operation to be carried out consists in establishing an "optical contact" between the optical contacting device constituted essentially by the optical assembly 4, and the reflective surface 2 of the component 1, that is to say in positioning the contacting device 4 in relation to the face 2 or vice versa, depending upon the particular application, so that the position of the contacting device 4 accurately marks that of the face 2. This kind of "optical contact", by eliminating any physical contact, overcomes the drawbacks attaching to the latter.

A contacting device of this kind comprises a Michelson interferometer one of the mirrors of which is constituted by the face 2 of the component whose position is to be marked. A second mirror 5 constitutes for example the reference mirror of the interferometer. A light source 6 illuminates the two mirrors through a semi-reflective plate 7. A photoelectric detector, 8, for example, produces a signal representing the passage of interference fringes corresponding to the variation in the phase difference between the reference and measurements arms of the interferometer, that is to say between the beams which are respectively incident upon the mirrors 5 and 2.

The light source 6 illuminates the interferometer of the contacting device 4 over a sufficiently wide spectral width to ensure that the amplitude of the interference fringes detected by the detector 8 for example, decreases rapidly when the relative positions of contacting device 4 and component 1 deviate from the position in which optical contact is obtained, that is to say in which the phase difference between the measurement and reference arms of the interferometer is zero, this position corresponding to a maximum-intensity white fringe.

In order to obtain an appropriate spectral width, the source 6 will advantageously be constituted by two sources 9 and 10 having an emission spectrum including two distinct spectral portions, for example a hydrogen lamp which radiates at a wavelength of between 0.36 and 0.6 $\mu$, and a tungsten iodine lamp which radiates at a wavelength between 0.6 and 2.5 $\mu$. A semi-reflective plate 11 enables the radiation from the two sources to be mixed. In order to take account of the spectral width of this composite source, advantageously the interference fringes are received at two different detectors 8 and 12 each of which is adapted to the emission spectrum of one of the two sources. The detector corresponding to the hydrogen lamp, whose emission range is within the visible spectrum, will for example be a conventional photomultiplier, whilst the detector corresponding to the tungsten-iodine lamp, will be a lead sulphide cell.

FIG. 2a illustrates the form of the signals obtained at the combined output 13 of the two detectors 8 and 12 and corresponding to the interference fringes detected on the occasion of a relative displacement between the contacting device 4 and the reflective surface 2, about the position 0 corresponding to the optical contact situation.

This curve indicates that the central fringe corresponding to said contact and consequently to the desired marking, is clearly distinguishable from the neighboring fringes. Its width 1 is in the order of 0.7 $\mu$.

However, it is rather difficult to denote the position of the face 2, which corresponds to the peak 0 of the central fringe. In other words, in the neighborhood of the zero point, the amplitude variation for a displacement $x$ of one-tenth of a micron, is very small.

In order to increase the marking accuracy, a phase-shift element is placed on one of the interferometer channels and is modulated by a pilot oscillator; synchronous detection of the signal obtained produces a signal which varies rapidly around the zero point, as shown in FIG. 2b.

In the example of FIG. 1, this modulated phase-shift element is constituted by the reference mirror 5 of the interferometer. For this purpose, the mirror is mechanically fixed to piezoelectric ceramic elements 14 controlled by a pilot oscillator 15 whose operating frequency is for example 50 c/s, this latter causing slight displacement of said mirror about its mean position and thus varying the optical trajectory of the beam which it reflects. A synchronous demodulator 16, controlled by the oscillator 15, demodulates the signal produced by the two photoelectric detectors 8 and 12 and furnishes a signal such as that marked $b$ in FIG. 2. The width of the central virtually linear part of this curve, is in the order of 0.3. $\mu$. By interpolating to a tenth, and this is entirely reasonable, the accuracy of the marking of the position of the face 2, is around 0.03 $\mu$.

In order to further facilitate the marking of the optical contact condition, the parasitic signals surrounding the effective central portion of the signal $b$ in FIG. 2, are suppressed. To this end, the signal $b$ obtained at the output of the demodulator 16 is applied to an electronic gate 17 the opening of which is controlled by a threshold circuit such as a Schmitt multivibrator 18 receiving the signal $a$ coming from the detectors 8 and 12, the threshold of said circuit corresponding to the levels S and S' delimiting the linear part of the curve $b$. The signal which it produces has the form of the signal $d$ in FIG. 2, and the gate 17 is open when the amplitude of the signal $a$ is in excess of SS'. The signal produced by the gate 17 has the form of the signal $c$ in FIG. 2; it is applied for example to a voltmeter 19 the zero reading of which characterizes optical contact.

Moreover, the multivibrator 18 can be used to control the ignition of pilot lamps which facilitate measurement; the lighting up of a green lamp, controlled by the unblocking of the multivibrator, corresponds to the opening of the gate 17, whilst the lighting of a red lamp, controlled by the other condition of the multivibrator, corresponds to the closing of the gate. These lamps thus indicate the instant at which the phase difference is sufficiently small for the position of the face 2 to be marked accurately by the voltmeter 19.

In order to improve the waveform of the signals shown in FIG. 2, a filter 20 can be located in the trajectory of the beam from the source 6, to correct, as a function of the wavelength, the variations in the intensity of the sources and the sensitivity of the photoelectric detectors.

On the other hand, although the sources 9 and 10 are not coherent, it is possible, bearing in mind the low light intensity which is required for the operation of the system, to define source points of small diameter which, with the help of lenses 21, 22 can produce a lightly divergent beam. The measurement beam which is incident upon the face 2, can be relatively wide and quasi-parallel. This beam thus covers a relatively substantial part of the surface 2 (its diameter is for example in the order of 10 mm), and cuts out the effect of local variations in the coefficient of reflection of this face, whereas in certain prior art optical sensing devices which require a very small-diameter light spot for measurement, such variations are the source of considerable nuisance.

As already described, there are two particularly relevant applications for contacting devices of this kind. In a first application, concerned for example with the manufacture of sub-miniature circuits, the optical contacting device is used to accurately position components and is assembled upon the production machine for example upon a moving carriage. A first component is positioned accurately on this machine; the contacting device is then brought into optical contact with a reflective surface of said component and stops in this position. It is then a very simple and rapid operation to position other components in the same way and with a very high degree of accuracy. A combination of several mobile contacting devices, on several axes, enables complete spatial definition of the position of these components.

The second application of contacting devices of this kind is in the measurement of lengths by laser metrology techniques for example.

FIGS. 3 and 4 schematically illustrate a laser evacuated metrology bench, of known kind, in which the use of optical contacting devices in accordance with the invention improves the accuracy of measurement.

This bench comprises in particular a stabilized cast frame upon which there displaces a carriage 31 enabling the length L of a component 32 to be defined between two optical contacting devices 33 and 34, and a tube 35 slotted at its top part and enclosing a Michelson interferometer with two reflecting trihedrons 36 and 37 and connected to the frame 30 by two supports 38 and 39.

The moving reflecting trihedron 36, is fixed to a rigid plate 300 passing through the slot formed longitudinally in the upper part of the tube 35. Said plate is connected to the carriage 31 through the medium of a component 301 which has rigidity in the longitudinal direction. The fixed reflecting trihedron 37 is connected to the frame 30 by a support 40 which passes through the tube 35 although it is not rigidly connected therewith. A flexible diaphragm 41 arranged between the tube 35 and the support 40 provides a seal between said two components whilst mechanically decoupling them from one another. A vacuum pump 42 enables a vacuum to be produced inside the tube or enclosure 35 so that the measurement interferometer is not affected by the presence of air.

The tube is sealed at the upper slot, by a flexible seal through which the plate 300 passes. A coherent light source 43 such as an HeNe monomode high-stability laser, illuminates the interferometer through a sealed slot 44.

The measurement of the length L of the component 32 is effected by counting the number of fringes passing in front of the optical-electrical receivers contained in a unit 45, as the carriage 31 moves from a first position corresponding to zero length to a second position in which the two contacting devices 33 and 34 are in optical contact with the two opposite faces of the component 32. The unit 45 is for example a fringes counting circuit. The measurements of incremental length effected by this unit will advantageously be carried out using a measurement quantum of $\pi/n$, where $n$ is greater than 2; by means of a device supplying $n$ systems of interlaced fringes.

FIG. 5 schematically illustrates an embodiment of optical contacting devices in accordance with the invention, which is particularly well suited to the measurement of the length L of the component 50. In this figure, all that has been illustrated are the elements essential to an understanding of the operation of the system.

A source 6 identical to that of FIG. 1, illuminates the two optical contacting devices which each comprise an interferometer designed in a special way, thus simply enabling measurement of zero and of L to be effected.

The measurement interferometer, contained in the tube 35 of FIG. 3, is illustrated highly schematically in the form of its two reflecting trihedrons 36 and 37 and the laser beam received, on passage through the interferometer, by the unit 45 of FIG. 3. In FIG. 5, the moving reflecting trihedron 36 is illustrated in the first position 51 which corresponds to the determination of the zero point and in the second position 52 which corresponds to the measurement.

Each of the two optical contacting devices (33 and 34 in FIG. 3) receives the beam coming from the source 6 and converts it into two parallel beams by means of a Koster prism 53, 54. One of the two beams thus produced is reflected by the corresponding reflective surface 55 and 56 of the component 50, whilst the second beam is reflected by one of two mirrors, 57 and 58, coupled at part of their reflective surfaces by molecular adhesion, said two mirrors following the displacements of the moving reflecting trihedron 36 of the measurement interferometer.

After reflection upon faces 56, 58 and 55, 57, the beams emerge from the two optical contacting devices 33 and 34. These are processed by circuits identical to those of FIG. 1 and not shown here, each beam being received by two photoelectric detectors whose output signals are processed in the manner hereinbefore described.

The modulation of the optical trajectory of one of the two beams of each interferometer is achieved, for example, in a known manner, the method differing slightly from that described in relation to FIG. 1. A parallel-face plate, not shown in FIG. 5, is located in the trajectory of one of the two beams reflected by each interferometer, and is inclined in relation to the axis of said beam, by vibrating about its mean position so that is subtends a periodically varied angle at said axis. The vibration of said plates are produced for example, by means of electromagnets acting upon their mounts and controlled by the pilot oscillator (15 in FIG. 1) in the circuits associated with the optical sensing devices.

During a first phase, in order to obtain a null indication on the right side of FIG. 5, the carriage incorporating the two mirrors 57 and 58 and the moving reflecting trihedron 36, is brought into the position 51 in which the contacting device 33 establishes optical contact between the reflective surface 56 of the component 50 and the reflective face of the mirror 58. This optical contact is determined, as before, by the appearance of a null indication of the voltmeter in the circuits associated with the sensing device 33. At this instant, the fringe-counting unit 45 processing the interference fringes from the measurement interferometer proper, is reset to zero.

During a second phase, the assembly of two mirrors and the moving reflecting trihedron is brought into the position 52 in which the sensing device 34 establishes optical contact between the reflective surface 55 of the component 50 and the reflective face of the mirror 57, this contact being determined by the appearance of a zero on the voltmeter in the circuits associated with the contacting device 34.

Between these two operations, the reflecting trihedron 36 of the measurement interferometer will have travelled the distance L which separates the two faces of the component 50 and the fringe-counting unit 45 will read the corresponding number of interference fringes and the fraction of fringe, which have passed by during this time.

One of the advantages of this embodiment is that the component being measured does not have to be displaced during the measurement. It is sufficient, at the commencement of the measurement, to position the component and the contacting device 34 in such a way that the distance between the faces of the component and the Koster prisms, is in the order of some few cm.

In order to exclude any measurement error, it is necessary that the axis of the component, parallel to the length being measured, shall be strictly, parallel to the axis of the laser beam of the measurement interferometer. The optical contacting devices in accordance with the invention enable a very high degree of accuracy in the positioning of the component being measured to be effected, and in particular enable excellent parallelism of the axis of the component and the measurement axis, that is to say the axis of the laser measurement beam, to be achieved. To this end, it is merely necessary to visualy observe the beams produced by each interferometer after having placed the component 50 in position and prior to carrying out the measurement. The observation, effected for example through self-collimating telescopes 501 schematically illustrated in FIG. 5, shows for example a uniformly illuminated or flat-tint viewing field indicating that the axis of the component is substantially parallel to the measurement direction. By contrast, any observation of irregularities of tint and illumination, indicates that the direction of the axis of the component is not correct. Correction of this alignment until the flat tint is re-established, will eliminate this drawback.

Figure 6A:
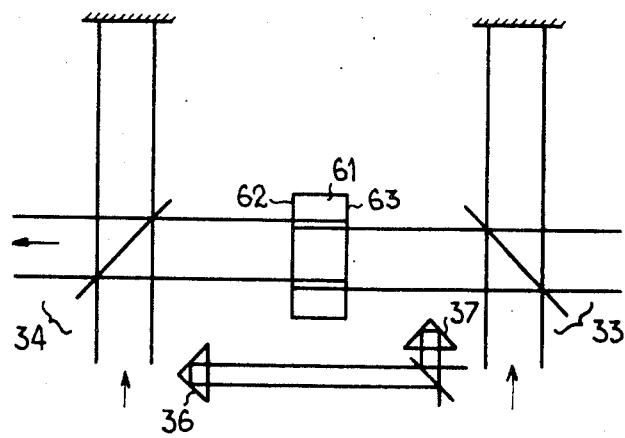
FIGS. 6a and 6b are explanatory diagrams.
Figure 6B:
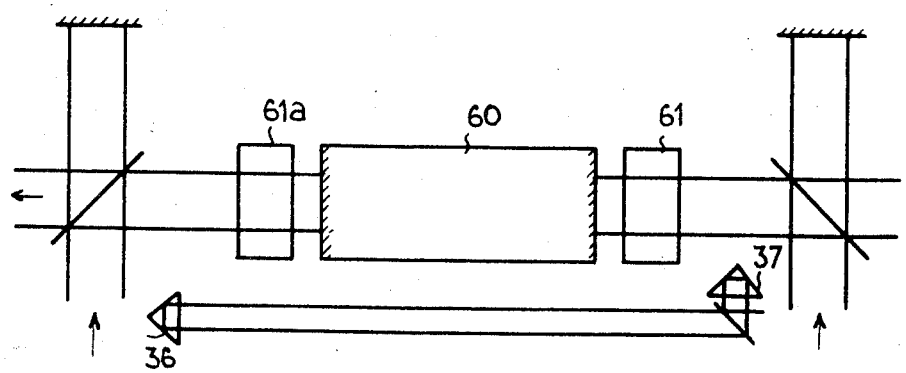

FIG. 6 provides a highly schematic illustration of another embodiment of optical sensing devices in accordance with the invention utilized in this case to measure the length L of a component 60, although they could equally well be used for a simple positional marking function.

In this variant embodiment, each contacting device comprises an interferometer such as that of FIG. 1, its source and its processing circuits.

Measurement of the zero position (FIG. 6a) is effected by means of a first parallel-face plate 61 arranged between two contacting devices 33 and 34. Optical contact is established in the case of the contacting device 34 (the moving reflecting trihedron 36 of the measurement interferometer is attached to it) with the face 63 of the plate 61. A similar condition is established for the contacting device 33 with the pace 62 of said same plate. The counter unit is reset to zero.

The measurement of the length L of the component 60 (FIG. 6b) is effected by displacing the contacting device 34 and the associated reflecting trihedron 36, inserting the component 60 between the two contacting devices, and between the contacting device 34 and the component 60 a second parallel-face plate 61a correctly identical with the first 61 and establishing optical contact between each of the two contacting devices at the reflective faces of the component 60 by displacing the said component 60 in relation to the contacting device 33, then the contacting device 34 in relation to the component 60 whose position has thus been established. The measurement of L is given by the number of fringes and fringe fraction counted due to displacement of the reflecting trihedron 36.

Thus, the optical contacting devices whose improvements have been described, permit the components to be positioned and/or measured, with a very high degree of accuracy. They are relatively simple to use and do not have the drawbacks of mechanical contact sensing devices, the accuracy of whose contact is substantially poorer, nor do they exhibit the drawbacks of other prior art optical device which generally requires a very delicate handling.

The foregoing description has been given by way of a non-limitative example and other variant embodiments are entirely possible without departing from the scope of the invention.

What we claim is:

1. An optical contacting system for supplying an indication of the length difference between a first and a second optical path respectively ending on first and second reflecting faces, said contacting system comprising: a source of radiant energy supplying a beam having an emission spectrum including two distinct spectral portions, beam splitting means having an input for receiving said beam, first and second outputs for supplying split beams respectively illuminating said reflecting faces, and a further output; first and second photoelectric means positioned for receiving from said further output radiant energies respectively reflected from said faces, said photoelectric means having respective outputs; means for periodically modulating the length of one of said optical paths at a predetermined frequency; synchronous demodulator means operated at said frequency and having an input connected to the outputs of said photoelectric means, and an output; threshold means having an input coupled to said demodulator means input and an output; gating means having an input coupled to the output of said threshold means, a further input coupled to the output of said demodulator means and an output for delivering a signal, and indicator means coupled to said gating means output for receiving said signal; said photoelectric means being respectively responsive to said spectral portions.

2. An optical contacting system as claimed in claim 1, wherein said beam splitting means comprise a semi-transparent mirror.

3. An optical contacting system as claimed in claim 1, wherein said modulating means comprise an electro-mechanical transducer coupled to one of said faces and an A.C. generator for delivering to said transducer a voltage having said frequency; said demodulator means having an input for receiving said voltage.

4. An optical contacting system as claimed in claim 1, wherein said threshold means comprise a SCHMITT multivibrator having an input coupled to said demodulator means input through a low pass filter.

5. An optical contacting system as claimed in claim 1, wherein said indicator means comprise a null indicator, said null indicator indicating that said signal value is zero.

6. An optical contacting system as claimed in claim 1, wherein said beam splitting means comprise a pair of identical triangular prisms, each prism having a first semi-transparent lateral face, a second lateral face perpendicular to said first face and a third lateral force; said prisms being adjacent along said first lateral face; said second lateral face of one of said prisms being coplanar with said second lateral face of the other of said prisms, and parallel to said reflecting faces; said paths reaching said reflecting faces at normal incidence.

7. An optical contacting system as claimed in claim 1, wherein one of said reflecting faces comprises two partially overlapping reflector elements having reflecting surfaces lying in a common plane.

8. A metrology bench incorporating optical contacting systems as claimed in claim 1, for measuring the distance separating two reflecting end faces of an object; said metrology bench comprising: first and second optical contacting systems respectively positioned at each end of said bench, each of said optical contacting systems including: a source of radiant energy supplying a beam having an emission spectrum including two distinct spectral portions, beam splitting means having an input for receiving said beam, first and second outputs for supplying split beams respectively illuminating said reflecting faces, and a further output; first and second photoelectric means positioned for receiving from said further output radiant energies respectively reflected from said faces, said photoelectric means having respective outputs; means for periodically modulating the length of one of said optical paths at a predetermined frequency; synchronous demodulator means operated at said frequency and having an input connected to the outputs of said photoelectric means, and an output; threshold means having an input coupled to said demodulator means input and an output; gating means having an input coupled to the output of said threshold means, a further input coupled to the output of said demodulator means and an output for delivering a signal, and indicator means coupled to said gating means output for receiving said signal; said photoelectric means being respectively responsive to said spectral portions; said metrology bench further comprising: a carriage sliding on said bench and interferometric displacement sensing means for accurately measuring the displacement of said carriage along said bench; one of the reflecting faces of said optical contacting systems being one of the reflecting faces of said object; said other reflecting face of said optical contacting systems being integral with said carriage; the reflecting faces of said object being perpendicular to the direction of translation of said carriage.

9. A metrology bench as claimed in claim 8, wherein said object is a transparent plate having two parallel reflecting faces.

10. A metrology bench as claimed in claim 8, wherein said displacement sensing means are located within an evacuated enclosure.

11. A metrology bench as claimed in claim 8, further comprising: autocollimator means, said means being optically coupled to said beam splitting means through said further output, for checking the parallelism of the reflecting faces of each of said optical contacting systems.

12. A metrology bench as claimed in claim 8, wherein said optical contacting system are fixed on said bench; the radiant energy being supplied to said optical contacting systems from a single source of radiant energy.

* * * * *

UNITED STATES PATENT OFFICE
CERTIFICATE OF CORRECTION

Patent No. 3,738,754      Dated   June 12, 1973

Inventor(s) Raymond Marcy and Michel Lacombat

It is certified that error appears in the above-identified patent and that said Letters Patent are hereby corrected as shown below:

In the heading:

Item [30] Foreign Application Priority Data read "701063" as -- 70 10163 --

Signed and sealed this 5th day of March 1974.

(SEAL)
Attest:

EDWARD M. FLETCHER, JR.
Attesting Officer

C. MARSHALL DANN
Commissioner of Patents